Patented Jan. 23, 1945

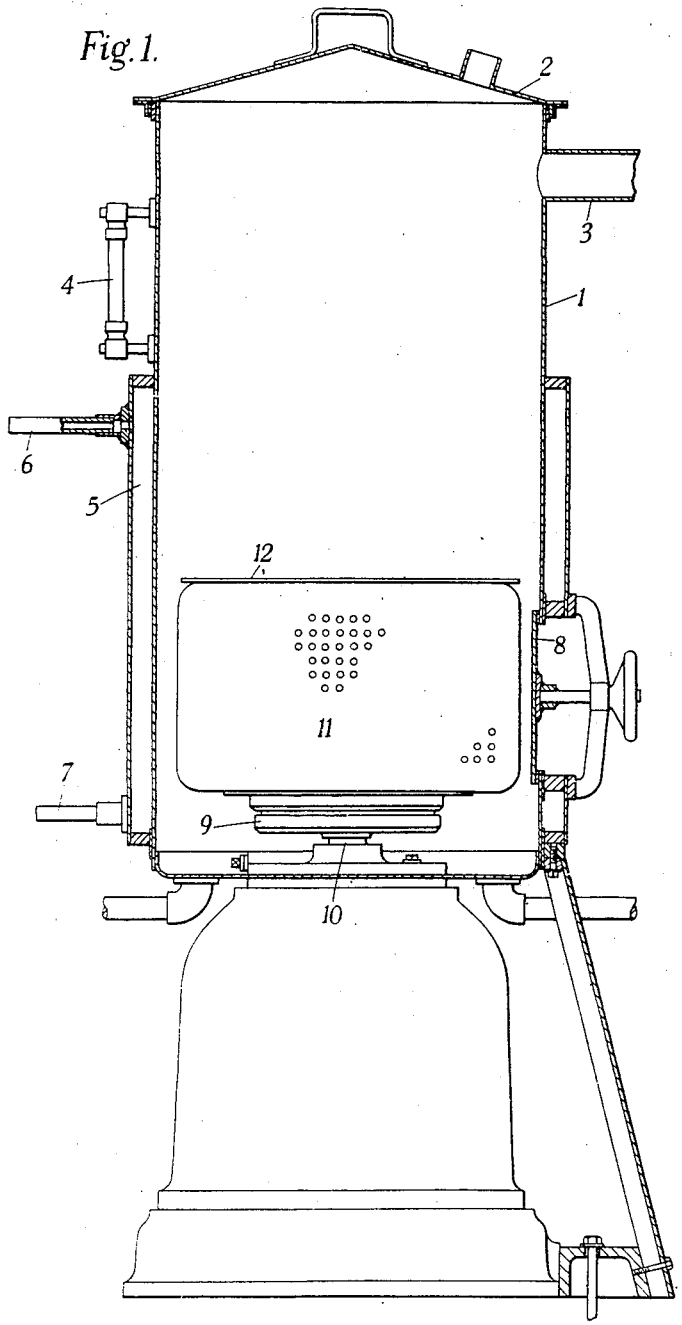

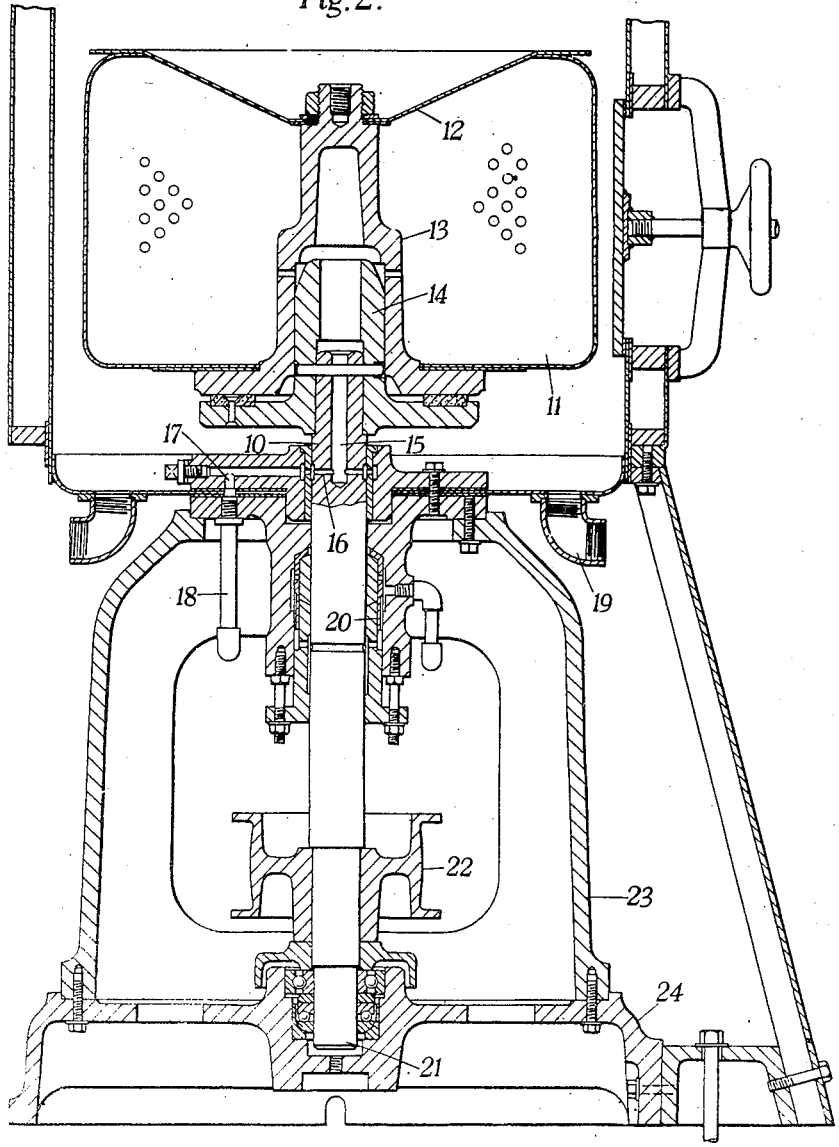

2,368,028

UNITED STATES PATENT OFFICE 2,368,028

TREATMENT OF OIL OR FAT CONTAINING MATERIAL FOR THE RECOVERY OF OIL OR FAT THEREFROM

Joseph Charles Kernot, Mayfield, near Tunbridge Wells, and Victor Silberstein, Kensington, London, England Application December 17, 1941, Serial No. 423,390 In Great Britain May 23, 1940

5 Claims. (Cl. 210—49.5)

This invention relates to the treatment of oil or fat-containing material, and for instance, waste meat and butcher's offal and generally meat of low value and kitchen and camp refuse and the like, including material of the character above referred to in which putrefaction or other changes have already commenced for the recovery of oil or fat therefrom.

The object of the invention is to enable such material to be treated in order to enable the oil or fat component or content thereof to be economically separated and recovered and to leave a product which may be employed for other purposes and in the case of waste meat and the like more especially as or in the preparation of feeding stuffs, fertilisers and the like by subjecting oil or fat-containing material to treatment in the presence of an aqueous medium containing a portion of a material adapted to secure the lowering of the surface tension whereby the oily or fatty material will be caused to separate from the albuminous or other non-fatty components.

According to the invention the oil or fat-containing material is subjected to treatment at a temperature in the neighbourhood of 100° C. in the presence of an aqueous medium by enclosing the material in a container or chamber having a perforated wall and located in the lower portion of a treating vessel, and introducing into the container and the treating vessel an aqueous medium containing a proportion of a substance adapted to secure a lowering of the surface tension whereby the oily and fatty components of the material are caused to separate from the non-fatty components and flow upwardly through the medium in the vessel in a finely divided state to an overflow provided at the upper part of the vessel.

Preferably in accordance with the invention, the oil or fat-containing material is subjected to the action of saturated or superheated steam prior to the introduction of the aqueous medium into the vessel.

In one form of apparatus employed in carrying out the invention, the container in which the material is enclosed may resemble a centrifuge disposed in the lower part of a relatively deep vessel and associated with means whereby it may be rotated during the operation of freeing the oil or fat from the non-fatty materials and may after the aqueous medium has been removed from the vessel be subjected to rotation in order to expel all or the greater proportion of the aqueous medium retained by the residue and assist in the removal of residual oil or fat. If necessary, or desirable after the oil or fat material or the greater proportion thereof has been removed from the vessel, the residual material may be subjected to the action of superheated steam while the container is maintained in motion.

Normally in accordance with the invention the treating vessel in which the container for the material is disposed is adapted to contain a volume of medium which is three or four times the volume of the container and the vessel will be so dimensioned as to provide a deep layer of liquid above the container.

Generally, the container is in the form of a basket such as is employed in centrifuges but furnished with a lid or closure to retain in it the material under treatment. The basket may be arranged to be removed from the vessel for charging and discharging and it may in such case be arranged to be engaged on a platform or directly on a spindle to which rotary or like motion may be imparted.

With the vessel there is preferably associated means whereby superheated steam may be caused to impinge on the material to be treated.

Thus, for instance, the platform or spindle may be furnished with such means, the spindle for example being hollow and provided with a plurality of holes through which the steam will pass.

Preferably, in accordance with the invention, the oil or fat which is caused to separate in the apparatus in which the initial oil or fat-containing material is subjected to treatment in the manner above referred to, is delivered therefrom and caused to flow through other bodies of an aqueous medium the composition of which may be generally the same as that employed in the vessel in which the waste is subjected to treatment, or may be of a composition different therefrom. A wide variety of materials, such for instance, as those functioning as froth or foam-forming agents and/or as emulsifiers or wetting-out agents, including organic or inorganic bodies, may be utilised for the purpose of lowering the surface tension.

Thus, for instance, alkalies in a very small proportion relatively to the water used are suitable for carrying the invention into effect.

For example, sodium carbonate or caustic soda in solution in the water employed for treating the offal in a concentration of say less than 0.5% and generally between 0.2 and 0.3% may be used, and always in concentrations such that decomposition or breaking down of the protein material will not result.

Alternatively, certain organic bodies of which alcohol, phenol, salts of phenolsulphonic acid or its homologues or allied bodies, for instance, benzene and naphthalene sulphonic acids, may be given by way of example, may be employed.

As will be appreciated, the choice of materials for the purpose in question will be restricted by considerations as to the uses to which the residual material, after the removal of the fat, is to be applied. For instance, the employment of materials exerting a harmful effect on animal or vegetable life, or being otherwise offensive and which cannot readily be extracted or separated by subsequent treatment, would be open to objection where the residual material is to be employed as food for animals or as fertilisers.

Certain methods of carrying out the invention will now be described more fully and by way of example.

The raw material, if offal, is subjected to the action of steam through the perforations of the spindle in order to break the fat containing cells; instead of steam, as in the case of very low grade material such as "searching" or "pickings" from slaughter houses, superheated steam is used with advantage. This treatment may last for varying periods according to the grade of material used, the period varying between 15 minutes and 1 hour in duration.

In the case of material such as fat-containing starch or filtering earth this treatment is unnecessary.

The aqueous medium, that is, for instance, soda ash solution, is introduced into and allowed to reach a height slightly below that of the overflow. By the help of the jacket or, if necessary, by steam, the solution is kept boiling for a period of 30 minutes or more according to the nature of the material used.

The aqueous medium is allowed to remain in the vessel at a temperature slightly below boiling point for a period of say, 30 minutes or more, the volume of the liquid being increased so as to allow the fatty or oily material to overflow in the collecting pan.

When all the fat has passed into the collecting pan the liquid is allowed to flow into a settling tank or direct to a separator whereby all the remaining traces of fat can be collected after cooling.

Saturated or superheated steam is admitted to the centrifuge basket through the openings in the spindle while the centrifuge is allowed to rotate first slowly and then at an increased speed.

If the amount of fat present in the offal or the like is large the operations described may be repeated. If small, only a small amount of solution is introduced into the pan and both this and the fat extracted transferred to the collecting pan or separator.

After removal of the bulk of the moisture by centrifuging the residue is dried either by superheated steam, or by a current of hot dry air the centrifuge rotating all the time.

The invention will be described further in detail and by way of example with reference to the accompanying drawings in which:

Figure 1 is a view in elevation partly in section of one construction in accordance with the invention and Figure 2 is a view on an enlarged scale and in section of the lower portion of the apparatus illustrating more clearly certain features of the apparatus.

In the drawings, 1 is a relatively deep vessel furnished at its upper portion with a cover 2 and an outlet pipe 3 for the fat or oil separated, a liquid level indicator 4 and a jacket 5 to which steam is admitted by way of a pipe 6 and an outlet 7, for condensed steam.

A manhole is provided in the lower portion of the vessel and with this manhole there is associated a cover 8.

In the lower portion of the vessel there is provided also a table 9 secured to a spindle 10 and on the table there is shown supported a basket 11 furnished with a cover 12. Into this basket, which is perforated, the oil or fat-containing material is introduced.

The basket comprises as will be seen from Figure 2, a central tubular element 13 which is arranged to engage over an extension 14 from the spindle 10, which is provided with a bored out portion 15 in communication with passages 16 which in turn communicate with a passage 17 connected with a pipe 18 by which steam at a relatively high temperature and, for instance, steam at a pressure of 25 lbs./sq. inch may be introduced, such high pressure steam being normally introduced in the initial stage of the treatment of the oil and fat-containing material.

If desired, high pressure steam may be introduced by way of this passage in order to dry out the residual material and similarly air may be introduced into this passage for the like purpose after the liquid contents of the vessel have been withdrawn by way of the pipe 19.

The spindle 10 is engaged in a bearing furnished with a stuffing box 20 and it is supported in a foot-step bearing 21. As shown, on the spindle there is provided a pulley 22 for effecting rotation of the basket the bearings for the spindle being supported in a housing 23 secured to a foundation plate 24.

As will be understood, with the spindle there may be associated the rotor of an armature.

In the use of a plant as above described, the fat-containing material is introduced into the basket to which the cover will then be applied. Steam at a relatively high temperature may then be introduced into the basket while it is maintained in rotation and the requisite quantity of an aqueous medium containing a body adapted to reduce the surface tension then introduced into the vessel to a depth at least sufficient to submerge the basket.

The basket will during this time be maintained in rotation and further quantities of the aqueous medium may be introduced into the vessel so as to cause the oil or fat separating to flow out by way of the pipe 3.

The oil or fat may be delivered into a vessel adapted to secure the separation of a proportion of water contained in it, and it may, thereafter, be centrifuged to remove a further proportion of water after which it may be passed through or into a vessel containing a decolourising agent such as fuller's earth or it may be mixed with fuller's earth and in either case filtered through a filter press or the like, the oil or fat passing from the filter press or the like to a vessel in which the fat is subjected to further heat treatment in order to effect the expulsion of any residual water which it may contain, the oil or fat finally being cooled.

In certain cases, in accordance with the invention, apparatus comprising a vessel which is not considerably deeper than the basket may be used, and such an arrangement is perhaps preferable where the plant is designed to treat large batches of fat-containing material.

Having now thus described our invention what we claim as new therein and desire to secure by Letters Patent is:

1. A method of treating oil and fat containing material for the recovery of oil or fat therefrom consisting of agitating a quantity of said material within a treating vessel while applying heat to the material to maintain the temperature thereof at approximately 100° C. and, during said agitating and heating, introducing into the vessel in contact with said material at a depth sufficient to submerge the material, an aqueous liquid containing a proportion of a substance adapted to lower surface tension without disintegration of non-fatty matter in the material being treated to cause finely divided particles of fatty matter to separate from said material and flow upwardly through the liquid to the surface thereof, and then introducing an additional amount of said liquid to overflow the removed fatty particles at the top of the liquid.

2. A method of treating oil and fat containing material for the recovery of oil or fat therefrom consisting of agitating a quantity of said material within a treating vessel while applying steam to the material to maintain the temperature thereof at approximately 100° C. and, during said agitating and steaming, introducing into the vessel in contact with said material at a depth sufficient to submerge the material, an aqueous liquid containing a proportion of a substance adapted to lower surface tension without disintegration of non-fatty matter in the material being treated to cause finely divided particles of fatty matter to separate from said material and flow upwardly through the liquid to the surface thereof, and then introducing an additional amount of said liquid to overflow the removed fatty particles at the top of the liquid.

3. A method in accordance with claim 2 including the further steps of withdrawing the liquid from the treating vessel after the removed fatty matter has been overflowed at the top of the liquid, and then rotating the residue of the treated material.

4. A method in accordance with claim 1 in which the concentration of surface tension lowering material in the aqueous liquid is less than .5%.

5. A method in accordance with claim 1 in which the surface tension lowering material is a soda ash solution and the concentration thereof in the body of liquid is not more than .5%.

JOSEPH CHARLES KERNOT.
VICTOR SILBERSTEIN.